United States Patent
Kumar KN et al.

(10) Patent No.: US 10,581,877 B2
(45) Date of Patent: Mar. 3, 2020

(54) NON-CONTACT CYBERSECURITY MONITORING DEVICE

(71) Applicant: HONEYWELL INTERNATIONAL INC., Morris Plains, NJ (US)

(72) Inventors: Dinesh Kumar KN, Karnataka (IN); Sandhya KR, Karnataka (IN)

(73) Assignee: Honeywell International Inc., Morris Plains, NJ (US)

(*) Notice: Subject to any disclaimer, the term of this patent is extended or adjusted under 35 U.S.C. 154(b) by 399 days.

(21) Appl. No.: 15/468,892

(22) Filed: Mar. 24, 2017

(65) Prior Publication Data

US 2018/0278628 A1 Sep. 27, 2018

(51) Int. Cl.
*H04L 29/06* (2006.01)
*H04W 12/08* (2009.01)
*H04W 12/12* (2009.01)
*G08B 13/24* (2006.01)
*G08B 29/18* (2006.01)

(52) U.S. Cl.
CPC ......... *H04L 63/1416* (2013.01); *H04W 12/08* (2013.01); *H04W 12/12* (2013.01); *G08B 13/2497* (2013.01); *G08B 29/18* (2013.01); *H04L 63/0428* (2013.01)

(58) Field of Classification Search
CPC .......... H04L 63/1416; H04L 63/0428; H04W 12/12; H04W 12/08; G08B 13/2497; G06B 29/18
USPC .......................................................... 726/22
See application file for complete search history.

(56) References Cited

U.S. PATENT DOCUMENTS

| 5,410,319 A | 4/1995 | Lopez et al. |
| 7,436,297 B1 | 10/2008 | Tucker |
| 9,306,622 B2 | 4/2016 | Kumar Kn et al. |
| 2014/0109182 A1 | 4/2014 | Smith et al. |

(Continued)

FOREIGN PATENT DOCUMENTS

WO 2016025226 A1 2/2016

OTHER PUBLICATIONS

NHK Van Eck Phreaking demonstration—Spy on Your Neighbor's Computer Nov. 10, 2010.*

*Primary Examiner* — Teshome Hailu
*Assistant Examiner* — Benjamin A Kaplan (57) ABSTRACT

A cybersecurity monitoring device includes an electromagnetic (EM) field sensor for sensing a modulated signal transmitted on an electrical cable which encodes information by varying properties of a periodic waveform. The cybersecurity monitoring device includes a processor and a memory storing a data decoding program including protocol information for identifying a plurality of different communication protocols. The cybersecurity monitoring device is adapted for use without electrical contact in proximity to the cable so that the EM field sensor detects an EM field emanating from the modulated. The data decoding program responsive to detecting the EM field performs signal conditioning including digitizing the sensed modulated signal to provide a digitized signal, decoding the digitized signal using the protocol information used by the modulated signal to generate a decoded signal data, and reporting the decoded signal data or tampering determined from the decoded signal data to a remotely located device or system.

20 Claims, 7 Drawing Sheets

(56) References Cited

U.S. PATENT DOCUMENTS

2015/0350228 A1  12/2015  Baxley et al.
2016/0065603 A1   3/2016  Dekel et al.

* cited by examiner

ования сред-ствам # NON-CONTACT CYBERSECURITY MONITORING DEVICE

FIELD

Disclosed embodiments relate to devices for cybersecurity monitoring.

BACKGROUND

Cybersecurity, also known as computer security and information technology security, is regarding protecting computers, networks, programs, and data from unintended or unauthorized access, change, or destruction. Cybersecurity includes controlling the physical access to hardware, and protecting against harm from network access, data and code injection, and operators, whether intentional, accidental, or due to being tricked into deviating from secure procedures. The field of cybersecurity is growing in importance due to the increasing reliance on computer systems and the Internet, wireless networks such as Bluetooth and Wi-Fi, and the growth of "smart" devices, including smartphones, televisions and devices as part of the Internet of Things (IOT).

Regarding process automation and custody transfer, one of the most dangerous threats can be unauthorized access to a legacy field device or a legacy system through vulnerable upper layers (or levels) because an attacker can gain full control over controls and safety systems and thus can upset the process. A process upset can lead to a major loss to life of people, product quality loss and/or financial loss. Currently such an unauthorized access is not easy to accomplish because this requires physical access to the hardware infrastructure. However, process automation and custody transfer technologies in industry are going through a digital transformation and are thus becoming increasingly connected to public networks. The greater the connectivity to public networks the more there is vulnerability to cybersecurity threats without the need for physical access to the hardware infrastructure, which can lead to threats including those related to personal safety, product quality and financial loss.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for modern industrial process facilities (industrial facilities) such as process automation and custody transfer which have communications dominated by technology variants of Ethernet and protocols including Transmission Control Protocol (TCP) and the Internet Protocol (IP), there are several tools and techniques available for monitoring communications and for the early detection of cyber threats. However, there exists a complex mix of different legacy and modern protocols especially in automation and controls and the long cycle time nature of the business results in slow migration to the latest technology. The legacy infrastructure will likely continue even after the industry is adapted to latest trends including IOT and the cloud because rip and replace of legacy controls and the automation infrastructure is a significant capital expense. Moreover, the higher the level of automation and sophistication, the higher will be the level of cybersecurity threats. This cybersecurity threat goes up exponentially as one connects the restricted industrial data communication infrastructure through public networks such as IOT and the cloud.

Disclosed embodiments include non-contact cybersecurity monitoring devices and methods that provide protocol 'sniffing' for cybersecurity monitoring in an industrial facility which satisfy the recognized need to heighten cybersecurity levels of existing legacy process automation infrastructure, particularly as there is a move to more and more IOT and cloud. One disclosed embodiment comprises a method of cybersecurity monitoring comprising providing a cybersecurity monitoring device including an electromagnetic (EM) field sensor configured for non-electrical contact sensing of a modulated signal transmitted on an electrical cable (cable) in an industrial facility that utilizes a communication protocol which encodes information by varying one or more properties of a periodic waveform. The cybersecurity monitoring device includes a processor and a machine readable memory storing data decoding program code and protocol information for identifying a plurality of different communication protocols.

The cybersecurity monitoring device is positioned without electrical contact but in proximity to the cable so that the EM field sensor detects an EM field emanating from the modulated signal to generate a sensed modulated (electrical) signal. The data decoding program implemented by the processor executes responsive to detecting the EM field signal conditioning including digitizing the sensed modulated signal to provide a digitized signal, decoding the digitized signal using the protocol information for the communication protocol used by the modulated signal to generate decoded signal data, and reporting the decoded signal data or reporting tampering to at least one remotely located device or system, such as to a computing system in the cloud in one embodiment.

"Remotely located" as used herein means remote from the cybersecurity monitoring device, and can include another handheld device or a computational device on the same plant level as the cybersecurity monitoring device. "Tampering" as used herein refers generally to all unauthorized transactions such as unauthorized attempted changes to setting(s) to a field device or unauthorized copying or storing of data or process controller coupled on the cable, denial of service by purposely increasing traffic or limiting the capability of the physical layer, or by confusing the field device or process controller.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
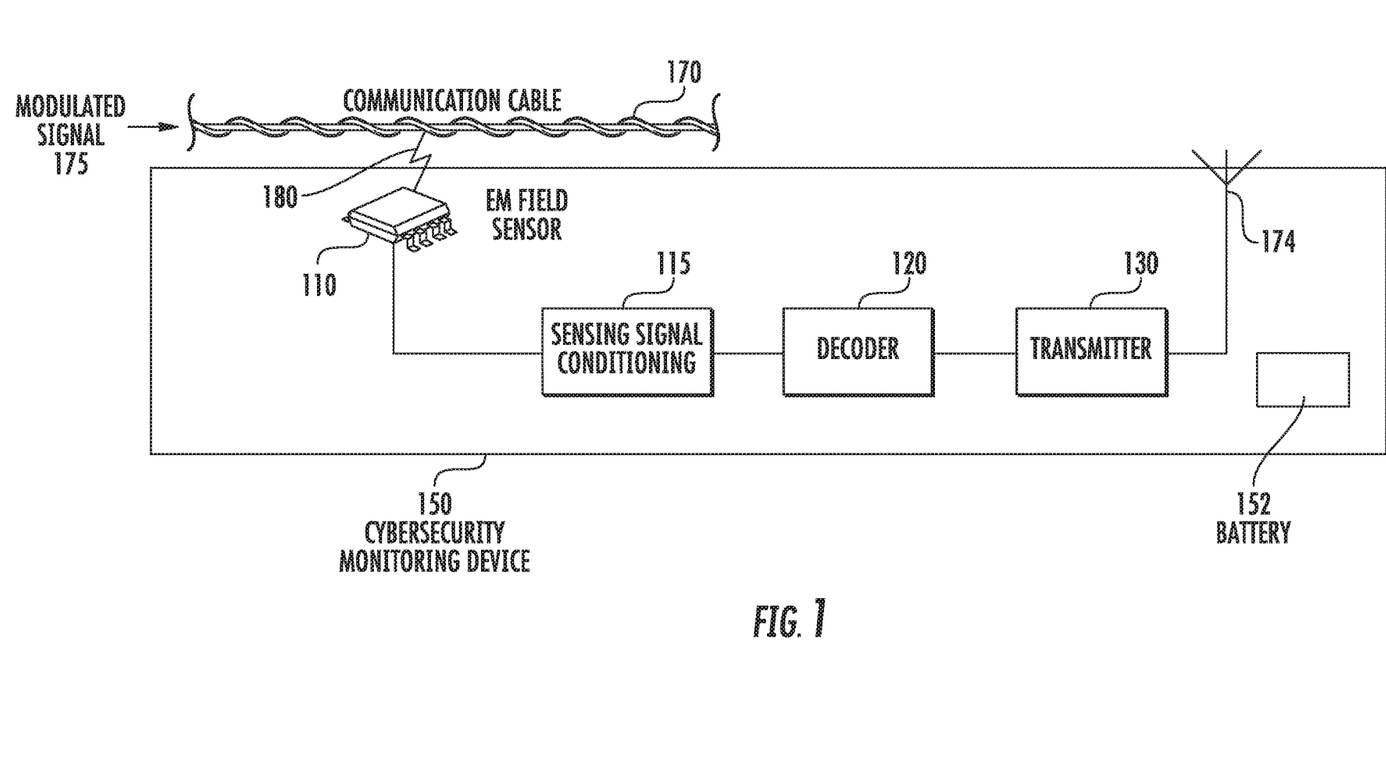
FIG. 1 is a block diagram of an example cybersecurity monitoring device for detecting an EM field emanating from a modulated signal in a cable, digitizing the sensed modulated signal, decoding the digitized signal, and reporting the decoded signal data or reporting tampering from the decoded signal data, according to an example embodiment.

FIG. 1 is a block diagram of an example cybersecurity monitoring device 150 that can be used in an industrial facility which can be a variety of manufacturing plants or be storage locations that handle, process, store and transport a liquid or fluid material. The industrial facility can for example, include manufacturing plants, chemical plants, crude oil refineries, ore processing plants, paper manufacturing plants, water processing plants and tank farms. These industries and facilities typically use continuous processes and fluid processing. The cybersecurity monitoring device 150 can be deployed in locations where a flammable hazardous material is present, such as per the International Electrotechnical Commission (IEC) 60079-x explosive atmosphere standards. Suitable device packaging and powering options can be employed based field requirements such as hazardous location requirements, environmental requirements, safety levels, and criticality of process. The cybersecurity monitoring device 150 can be mains powered, battery powered or be line powered.

The cybersecurity monitoring device 150 is shown including an EM field sensor 110 for sensing the EM field emanating from a modulating signal 175 transmitted on a cable 170 shown as a "communication cable", a sensing signal conditioning block 115, a decoder 120, a transmitter 130, and an antenna 174. The cable 170 generally comprise metal (or otherwise electrically conductive) wires which carry the modulated signal 175 between communication devices that can comprise field devices such as sensor or actuators generally having a transceiver and at least a process facility computer in a control room (see control room computer 440 in FIG. 4) or a process controller. The cable 170 can comprise twisted pair cables, shielded cables, or coaxial cables. The modulated signal 175 can be from a wide variety of electrical signals that use a variety of signal speeds, voltages, frequencies, modulation techniques and data transmission protocols.

In one particular embodiment, the modulated signal 175 can be a Bi-Phase Mark (BPM) signal. Other example modulated signal types include a HART signal, legacy signals such as profibus and BACnet, or more recently introduced signals including OLE for Process Control Unified Architecture (OPC UA), Ethernet, or profinet.

The cybersecurity monitoring device 150 can be used to sense, detect and decode modulated signals 175. In one embodiment the modulated signal 175 can be encrypted. For example, the operation of a cipher as known in encryption depends auxiliary information, commonly referred to as a "key". The encrypting procedure is varied depending on the key, which changes the detailed operation of the encrypting algorithm. A key is generally selected before using a cipher to encrypt a message. Without knowledge of the key, it is generally impossible to decrypt the resulting ciphertext into readable plaintext. In this this embodiment, the cybersecurity monitoring device 150 is provided the key.

Cybersecurity monitoring device 150 is generally a lightweight, portable, handheld, self-powered unit that can be readily transported by a user for use as an EM wave probe throughout an industrial facility. A battery 152 shown in FIG. 1 can supply power to the cybersecurity monitoring device 150. In another embodiment, as noted above, the cybersecurity monitoring device 150 can be powered via a utility power source (mains powered). As described above, the cybersecurity monitoring device 150 detects an EM field 180 emanating from the cable 170 without contacting any electrical conductor of the cable 170. As known in the art of physics, an EM field 180 is generated (governed by Maxwell's equations) when modulated signals 175 are transmitted in the form of modulated current on electrical cables such as cable 170. In one embodiment, the cybersecurity monitoring device 150 is placed adjacent to the cable 170 (e.g., no more than 10 centimeters away) in order to detect the EM field 180. In another embodiment, the monitoring device 150 can be clamped on or surround a dielectric coating generally on the cable 170 in order to detect the emanated EM field 180.

Cybersecurity monitoring device 150 is configured to not perturb the EM field 180 emanating from the cable 170 and to prevent coupling and reflection to obtain accurate signal measurement results. The EM field sensor 110 for the cybersecurity monitoring device 150 is generally based on one of the two main types of EM field sensor being (i) a broadband EM probe that performs broadband measurements which senses electric (E) or magnetic (H) fields signals across a wide range of frequencies (e.g., 100 kHz to 2,500 MHz) and typically includes three independent diode detectors or (ii) an EM probe that provides frequency selective measurements that includes a field antenna and a frequency selective receiver or spectrum analyzer to enable monitoring the frequency range of interest. EM field sensor 110 can be an E field sensor or an H sensor (e.g., an anisotropic magnetoresistance (AMR) sensor). Cybersecurity monitoring device 150 may respond to EM fields only on one axis, or may be tri-axial, showing components of the sensed EM field in three directions at once.

Cybersecurity monitoring device 150 can also generate a radio frequency (RF) signal. An RF signal can be generated by the cybersecurity monitoring device 150 in order to induce a test signal in the cable 170. In one embodiment, the cybersecurity monitoring device 150 is placed adjacent to cable 170 in order to couple a transmitted RF signal to the cable 170 and induce an electrical test signal in one or more conductors of the cable 170. Test signal can contain a test pattern that tests various operations or functions of devices or apparatus in the industrial facility, such as tank gauges (TGs) for level sensing involved in custody transfer.

Figure 2:
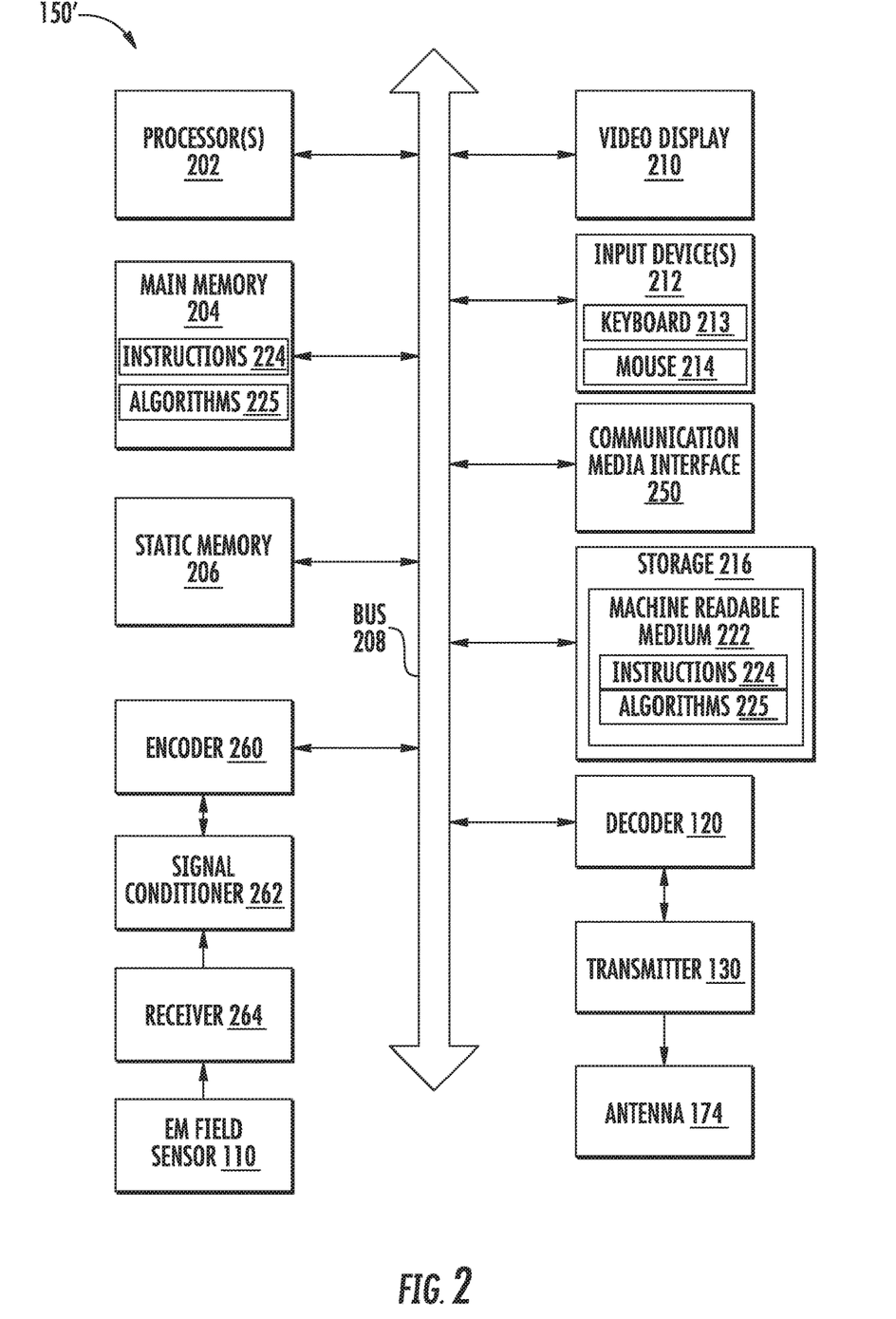
FIG. 2 is a detailed block diagram of the cybersecurity monitoring device shown in FIG. 1, according to an example embodiment.

FIG. 2 illustrates a block diagram of an example cybersecurity monitoring device 150' within which a set of instructions 224 and/or algorithms 225 can be executed causing the cybersecurity monitoring device 150 to perform any one or more of the disclosed methods, processes, operations, applications, or methodologies described herein. Cybersecurity monitoring device 150 includes one or more processors 202, a main memory 204 and a static memory 206, which communicate with each other via a system bus 208 which can represent a data bus and an address bus. Main memory 204 can store instructions 224 and/or algorithms 225 for execution by the processor 202. The processor 202 can comprise a microprocessor, digital signal processor (DSP), or a microcontroller unit (MCU). The cybersecurity monitoring device 150 generally further includes a video display 210 which is connected to system bus 208. The cybersecurity monitoring device 150 also has input devices 212 such as an alphanumeric input device (e.g., keyboard 213) and a cursor control device (e.g., a mouse 214) that are connected to system bus 208.

A storage device 216, such as a hard drive or solid state drive, is connected to and in communication with the system bus 208. The storage device 216 includes a machine readable medium 222 on which is stored one or more sets of software such as instructions 224 and/or algorithms 225 embodying any one or more of the methodologies or functions described herein. The main memory 204 also contains machine readable media.

While the machine readable medium 222 is shown in an example embodiment to be a single medium, the term "machine readable medium" should be taken to include a single medium or multiple media (e.g., a centralized or distributed database, and/or associated caches and servers) that store one or more sets of instructions. The term "machine readable medium" shall also be taken to include any medium that is capable of storing, encoding or carrying a set of instructions for execution by the computer system and that cause the computer system to perform any one or more of the methodologies shown in the various disclosed embodiments. The term "machine readable medium" shall accordingly be taken herein to include, but not be limited to, solid-state memories, optical and magnetic media, and carrier wave signals.

The EM field sensor 110 is connected to a receiver 264 that receives the sensed modulated electrical signal output by the EM field sensor 110. Signal conditioner 262 includes amplifiers and filters that condition and amplify the signals received from the receiver 264. Signal conditioner 262 can amplify and reject noise from the modulated signal received from receiver 264 and generate a conditioned modulated signal. Signal conditioner 262 is connected to an encoder 260. Encoder 260 is connected to system bus 208. Encoder 260 converts the conditioned modulated signals received from signal conditioner 262 which includes an analog to digital converter (ADC) into encoded digital signals and transmits the encoded digital signals to system bus 208. Cybersecurity monitoring device 150 further includes a communication media interface 250 that is connected to the system bus 208. In one embodiment, communication media interface 250 is a USB connector or an Ethernet connector that allows for the detected signals to be transmitted to another device.

Cybersecurity monitoring device 150 also has decoder 120 that is connected to system bus 208. Decoder 120 comprises a digital-to-analog converter (DAC), such as a sample and hold, which converts digital signals received from system bus 208 into analog signals. Decoder 120 is connected to transmitter 130. Transmitter 130 is connected to antenna 174. Transmitter 130 receives analog signals from decoder 120, generates an RF signal from the analog signal and transmits the RF signal on the antenna 174 over the air, such as to a computing system in the cloud.

Figure 3:
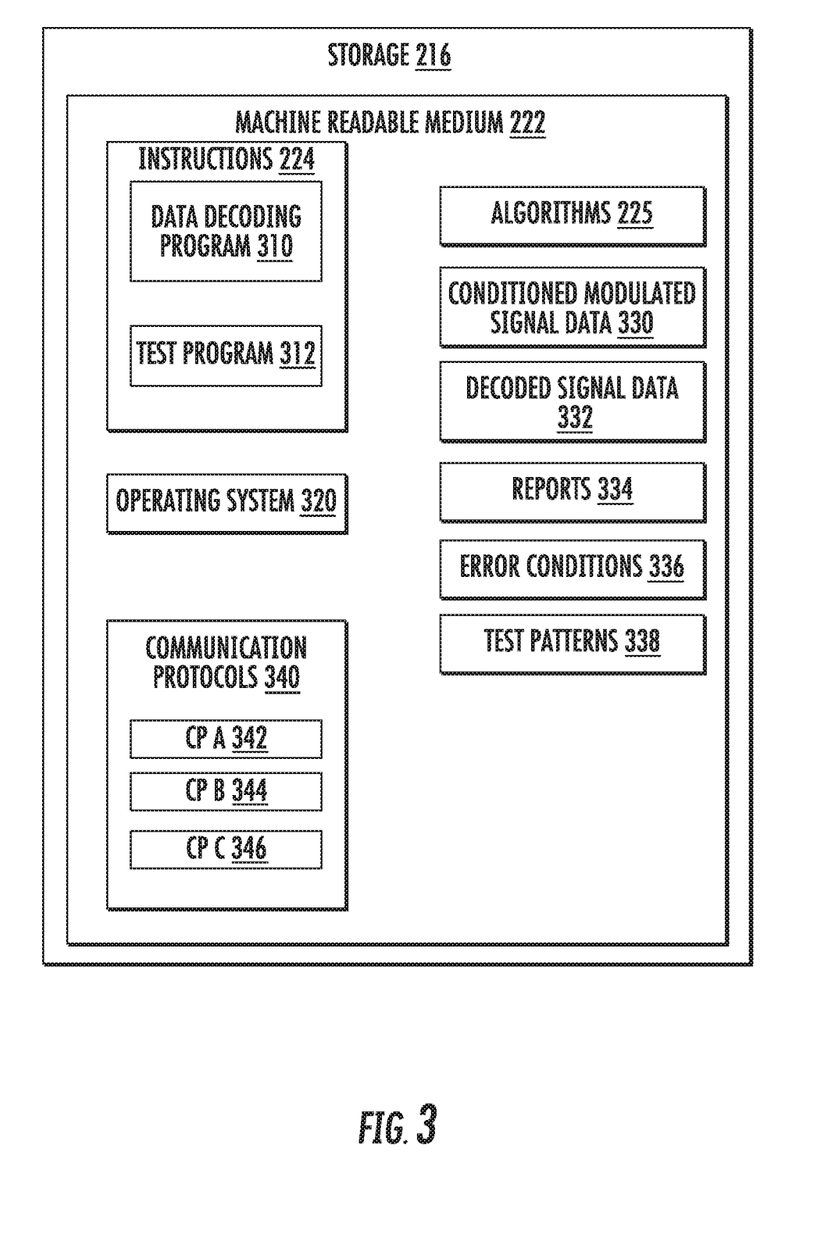
FIG. 3 shows example contents of a computer readable storage medium for a disclosed cybersecurity monitoring device, according to an example embodiment.

With reference now to FIG. 3, example contents of machine readable medium 222 stored within storage device 216 for a disclosed cybersecurity monitoring device 150 are shown. Machine readable medium 222 can store instructions 224 and/or algorithms 225 for execution by processor 202. Instructions 224 can include a data decoding algorithm or data decoding program 310 and a test algorithm or test program 312. Data decoding program 310, when executed by processor 202 can use stored protocol information to decode the conditioned modulated signal and generate decoded signal data 332. Optional test program 312 when executed by processor 202 causes the cybersecurity monitoring device 150 to transmit an RF signal over the air that induces a test signal in the cable 170.

An operating system (O/S) 320 is also stored in the machine readable medium 222. Machine readable medium 222 further can store conditioned modulated signal data 330 received from the encoder 260 and decoded signal data 332. Decoded signal data 332 is generated from conditioned modulated signal data 330. Machine readable medium 222 also can store reports 334, error conditions 336 and test patterns 338. Reports 334 can summarize selected decoded signal data 332. Error conditions 336 can contain error conditions detected in the modulated signal 175. For example, if the signal strength or noise level of the modulated signals 175 is outside of pre-determined limits, an error condition 336 can be generated. Modulated signal 175 can also include data regarding alarm events or error reported by other devices connected to the cable 170. Test patterns 338 are used by test program 312 to generate RF signal that induces a test signal in the cable 170.

Machine readable medium 222 further stores information regarding (identifying) communication protocols (CPs) 340. As noted above these protocols can include BPM, HART, profibus, BACnet, OPC UA, Ethernet, and profinet. A CP 340 is a set of rules for data exchange between apparatus in the industrial facility such as TGs and the control room computer 440. CP 340 define the syntax, semantics, and synchronization of communications. CP 340 includes several formats or protocols for exchanging data. CP 340 includes protocol information for identifying several different communication protocols including CP A 342, CP B 344 and CP C 346 (collectively CPs 342-346).

Figure 4:
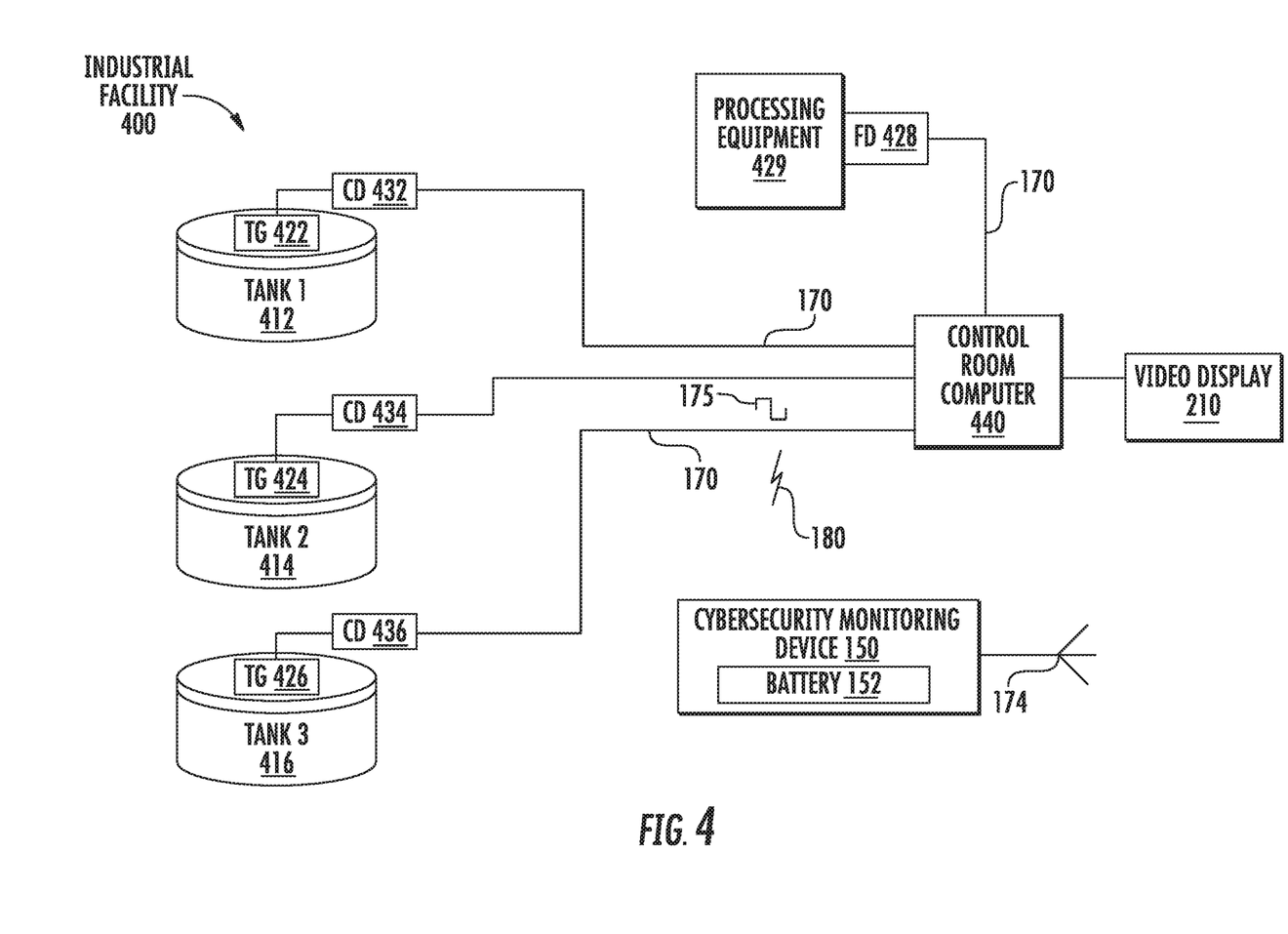
FIG. 4 is a block diagram of an example process facility including a disclosed cybersecurity monitoring device, according to an example embodiment.

FIG. 4 illustrates a block diagram of the example cybersecurity monitoring device 150 employed within an industrial facility 400. Industrial facility 400 comprises several liquid storage tanks including tank 1 412, tank 2 414 and tank 3 416 (collectively tanks 412-416). Tanks 412-416 are each able to receive, discharge and store a liquid or a fluid. Each tank has a tank sensor or tank gauge, referred to herein as being a "TG". Tank 1 412 has a TG 422. Tank 2 414 has a TG 424. Tank 3 416 has a TG 426 (collectively TGs 422-426). The TGs 422-426 function to measure or sense the liquid level contained within each of tanks 412-416 and to generate an electrical signal indicative of the level of liquid in each tank. In one embodiment, the TGs 422-426 can use radar to measure the liquid level contained in a respective tank. In another embodiment, TGs 422-426 can also function to regulate the intake and discharge of liquids in tanks 112-116. For example, TGs 422-426 can control valves mounted to respective tanks 412-416 in order to regulate fluid flow. The modulated signal 175 is shown in the cable 170 which generates an EM field 180 that is detected by the cybersecurity monitoring device 150.

Each of the TGs 422-426 is in communication with a control room computer 440 via a communication device (CD) that can comprise a transceiver that is in communication with a control room computer 440 via CD 432. TG 424 is in communication with control room computer 440 via CD 434. TG 426 is in communication with control room computer 440 via CD 136. Each of CDs 432-436 can send and receive data, instructions and information between control room computer 440 and TGs 422-426 over cables 170. There are also sensors or gauges besides TGs 422-426 in the industrial facility 400 shown as field device (FD) 428 associated with processing equipment (e.g., furnace) 429 coupled to cable 170, where FD 428 senses parameters associated with equipment 429, such as FD 428 sensing temperature, pressure, vacuum, or position.

A video display 210 is connected to control room computer 440. Video display 210 can show data received from TGs 422-426 to an operator or user. As described above, the cybersecurity monitoring device 150 is for detecting an EM field emanating from a modulated signal 175 in the cable 170, digitizing the signal, decoding the digitized signal, and reporting the decoded signal data or reporting tampering from the decoded signal data.

Figure 5:
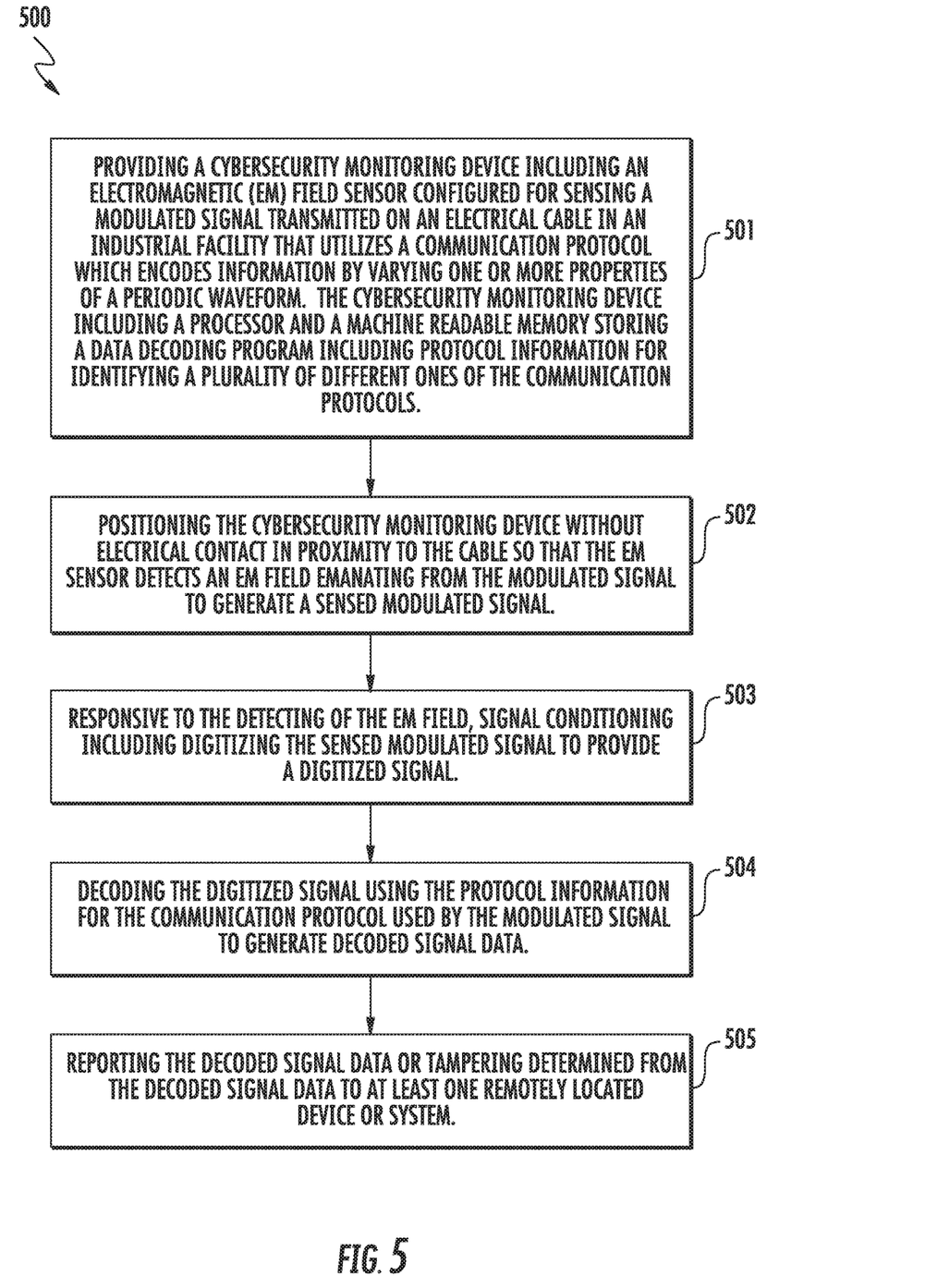
FIG. 5 is a flow chart that shows steps in an example method of sensing and decoding the EM fields from modulated signals on a cable within an industrial facility, according to an example embodiment.

FIG. 5 is a flow chart showing steps in an example method 500 method of cybersecurity monitoring. Method 500 comprises step 501 comprising providing a cybersecurity monitoring device including an EM field sensor configured for sensing a modulated signal transmitted on an electrical cable in an industrial facility that utilizes a communication protocol which encodes information by varying one or more properties of a periodic waveform. The cybersecurity monitoring device includes a processor and a machine readable memory storing a data decoding program including protocol information for identifying a plurality of different ones of the communication protocols. The data decoding program implemented by the processor executes steps 503, 504 and 505.

Step 502 comprises positioning the cybersecurity monitoring device without electrical contact in proximity to the cable so that the EM field sensor detects an EM field emanating from the modulated signal to generate a sensed modulated signal. Step 503 comprises responsive to the detecting of the EM field, signal conditioning including digitizing the sensed modulated signal to provide a digitized signal. Step 504 comprises decoding the digitized signal using the protocol information for the communication protocol used by the modulated signal to generate decoded signal data. Step 505 comprises reporting the decoded signal data or tampering determined from the decoded signal data to at least one remotely located device or system.

The method can also include encrypting for reporting the decoded signal data or tampering using encrypted reporting to the remotely located device or system. When the remotely located device or system is not reachable or is otherwise unavailable, the method can comprise automatically logging events and alarms in the machine readable memory. This enables a user to later physically connect the cybersecurity monitoring device to a suitable system to download the event or alarm information.

Disclosed methods can comprise the cybersecurity monitoring device being configurable for different identifying protocols, further comprising configuring the cybersecurity monitoring device to detect at least a first of the protocols. The cybersecurity monitoring device can be used to cross check an authenticity of updates being communicated over the cable to one or more field devices in the industrial facility, such as firmware updates. The method can comprise the cybersecurity monitoring device performing diagnostics of its own system and on its own power, and reporting its health-related information to the remotely located device or system.

Disclose embodiments can also be extended to the cybersecurity monitoring device simultaneously monitoring multiple data streams each using a different communication protocol being transmitted on a given single cable or other physical medium. In this embodiment, the stored protocol information for identifying a plurality of different communication protocols is used to identify 2 more simultaneously transmitted protocols. The multiple communication protocols can comprise different Internet protocols (e.g., TCP, UDP), different signal modulation techniques (e.g., frequency-shift keying (FSK), frequency modulation (FM), amplitude modulation (AM), or different channel encoding or multiple access techniques (e.g., Code Division Multiple Access (CDMA), or Time division multiple access (TDMA)) that share at a given time a single cable or other physical medium.

Disclosed embodiments can be applied to a variety of cybersecurity monitoring applications including cybersecurity monitoring for specific industrial protocols, data/cyber security monitoring for supervisory control and data acquisition (SCADA) applications and pipe line monitoring, tampering detection of custody transfer or metering data, such as electronic volume controllers (EVCs). Disclosed embodiments can also be applied to field maintenance and debugging applications by field engineers.

EXAMPLES

Disclosed embodiments are further illustrated by the following specific Examples, which should not be construed as limiting the scope or content of this Disclosure in any way.

Figure 6:
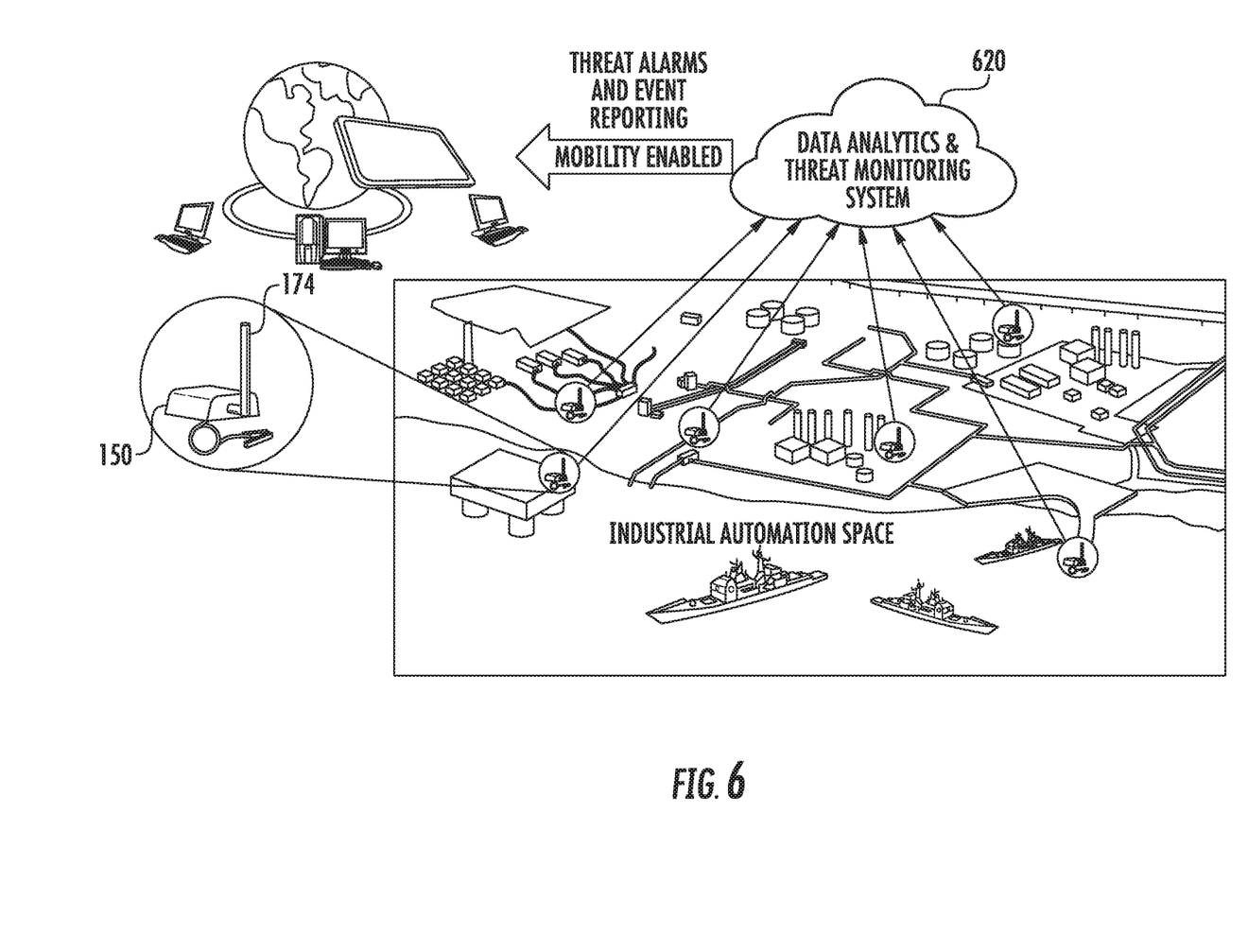
FIG. 6 shows an example application for disclosed cybersecurity monitoring devices in an industrial automation space reporting to a remote data analytics and threat monitoring system that is coupled to the cloud.

FIG. 6 shows an example application for disclosed cybersecurity monitoring devices 150 in an industrial automation space wirelessly reporting to a remote data analytics and threat monitoring system 620 that is coupled to the cloud. Six (6) cybersecurity monitoring devices 150 are shown spread throughout the industrial facility shown. As described above, disclosed cybersecurity monitoring devices can sense the EM field emanated by a modulated signal on the cable and decode the modulated electrical signal, then report the decoded signal to be analyzed remotely, or the cybersecurity monitoring device can report all decoded frames of data to a remote location where a computing system(s) in a remote location can identify a broader pattern of the intrusion, such as the remote data analytics and threat monitoring system 620 shown in FIG. 6. There can be different software package running with in the cybersecurity monitoring device 150 which is customized for a specific application. There can be different signal processing and filtering schemes for 'sniffed' signals because of the frequency of signal passing through the cable and other signal characteristics.

Further data analytics can be used to help affected parties to take timely corrective actions. For example, one can assess the threat level based on the criticality of the process or assets or personal safety. Analytics can be designed to present a summary to the user, or it can be decided to filter out false alarms. Analytics can help users to identify new cybersecurity threats and can implement upgrades with new configuration or data. Timely actions can be provided after assessing the security threat. This can comprise raising an alarm, shutting down that part of the field, providing a voice message to one of the field engineers asking him or her to physically go and check the current cybersecurity issue.

Figure 7:
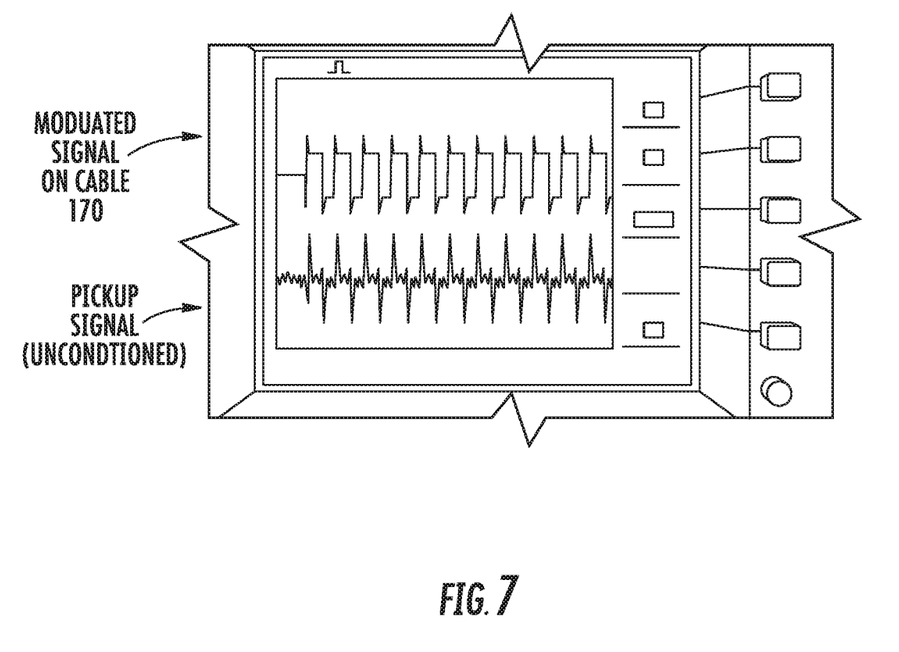
FIG. 7 shows an example of a measured modulated signal (top) flowing on a cable and the pickup signal (bottom) obtained from a disclosed cybersecurity monitoring device generated from the sensed EM field emanating from the modulated signal.

A proof of concept (POC) was demonstrated for non-electrical contact detection of modulated channels communicated on a cable using a disclosed cybersecurity monitoring device 150 realized on a sensor printed circuit board (PCB) with an AMR sensor AFF755B as the EM field sensor 110. FIG. 7 shows a modulated signal (top) flowing on a cable and the pickup signal (bottom) obtained from a disclosed cybersecurity monitoring device generated from the sensed EM field emanating from the modulated signal. The modulated signal is the signal passing through the cable 170 (oscilloscope connected to the cable with conventional direct electrical contact to the cable) and the pickup signal shows a raw signal generated from a disclosed cybersecurity monitoring device. The pickup signal will be conditioned and generally processed to re-create the modulated signal as close as possible.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, although disclosed for 'sniffing' modulated signals in cables, disclosed cybersecurity monitoring devices can be used more generally for "transmission mediums" that can include fiber optics and over the air. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of cybersecurity monitoring, comprising:
    providing a cybersecurity monitoring device including an electromagnetic (EM) field sensor configured for sensing a modulated signal transmitted on an electrical cable in an industrial facility that utilizes a communication protocol which encodes information by varying one or more properties of a periodic waveform, said cybersecurity monitoring device including a processor and a machine readable memory storing a data decoding program including protocol information for identifying a plurality of different said communication protocols; wherein said cybersecurity monitoring device is a portable handheld unit,
    moving said cybersecurity monitoring device for positioning said cybersecurity monitoring device without electrical contact in proximity to said cable so that said EM field sensor detects an EM field emanating from said modulated signal and to generate a sensed modulated signal;
    said data decoding program implemented by said processor executing:
        responsive to said detecting said EM field, signal conditioning including filtering and then digitizing said sensed modulated signal to provide a digitized signal;
        decoding said digitized signal using said protocol information for said communication protocol used by said modulated signal to generate decoded signal data, and
        reporting said decoded signal data or tampering determined from said decoded signal data to at least one remotely located device or system.

2. The method of claim 1, wherein said data decoding program further executes analyzing said decoded signal data to identify a presence of said tampering.

3. The method of claim 1, wherein said remotely located device or system provides analyzing said decoded signal data to identify a presence of said tampering.

4. The method of claim 1, wherein said cable is between a field device or a remote field mounted input/output (10) module and a process controller or a control room.

5. The method of claim 1, wherein said remotely located device or system is cloud-located.

6. The method of claim 1, wherein said reporting comprises wirelessly reporting.

7. The method of claim 1, wherein said cybersecurity monitoring device is configurable for different identifying protocols, further comprising configuring said cybersecurity monitoring device to detect at least a first of said protocols.

8. The method of claim 1, further comprising using said cybersecurity monitoring device to cross check an authenticity of updates being communicated over said cable to one or more field devices in said industrial facility.

9. The method of claim 1, wherein said reporting said decoded signal data or said tampering comprises encrypted reporting to said remotely located device or system.

10. The method of claim 1, wherein when said remotely located device or system is not reachable or is otherwise unavailable, automatically logging events and alarms in said machine readable memory.

11. The method of claim 1, wherein said modulated signal includes a plurality of said communication protocols simultaneously transmitted on said cable, wherein said digitized signal comprises a multi-protocol digitized signal, and wherein said decoding comprises generating a plurality of said decoded signal data.

12. A cybersecurity monitoring device, comprising:
    an electromagnetic (EM) field sensor configured for sensing a modulated signal transmitted on an electrical cable in an industrial facility that utilizes a communication protocol which encodes information by varying one or more properties of a periodic waveform, said cybersecurity monitoring device including a processor and a machine readable memory storing a data decoding program including protocol information for identifying a plurality of different said communication protocols;

wherein said cybersecurity monitoring device is a portable handheld unit that is adapted for use without electrical contact to be moved in proximity to said cable so that said EM field sensor detects an EM field emanating from said modulated signal and to generate a sensed modulated signal;

said data decoding program implemented by said processor executing:

responsive to said detecting said EM field, signal conditioning including filtering and then digitizing said sensed modulated signal to provide a digitized signal;

decoding said digitized signal using said protocol information for said communication protocol used by said modulated signal to generate a decoded signal data, and     reporting said decoded signal data or tampering determined from said decoded signal data to at least one remotely located device or system.

13. The cybersecurity monitoring device of claim 12, wherein said data decoding program further executes analyzing said decoded signal data to identify a presence of said tampering.

14. The cybersecurity monitoring device of claim 12, wherein said reporting comprises wirelessly reporting.

15. The cybersecurity monitoring device of claim 12, wherein said cybersecurity monitoring device is configurable for different protocols.

16. The cybersecurity monitoring device of claim 12, wherein said EM field sensor comprises an anisotropic magnetoresistance (AMR) sensor.

17. The cybersecurity monitoring device of claim 12, wherein said EM field sensor comprises a plurality of said EM field sensors for simultaneously monitoring a plurality of said modulated signals over multiples of communication channels.

18. The cybersecurity monitoring device of claim 12, wherein said cybersecurity monitoring device performs encryption so that said reporting said decoded signal data or said tampering comprises encrypted reporting to said remotely located device or system.

19. The cybersecurity monitoring device of claim 12, wherein when said remotely located device or system is not reachable or is otherwise unavailable, said cybersecurity monitoring device is configured to automatically log events and alarms in said machine readable memory.

20. The cybersecurity monitoring device of claim 12, wherein said modulated signal includes a plurality of said communication protocols simultaneously transmitted on said cable, wherein said digitized signal comprises a multi-protocol digitized signal, and wherein said decoding comprises generating a plurality of said decoded signal data.

* * * * *